United States Patent [19]

Howard, Jr.

[11] Patent Number: 5,210,130

[45] Date of Patent: May 11, 1993

[54] HOMOGENEOUS, HIGH MODULUS ULTRAHIGH MOLECULAR WEIGHT POLYETHYLENE COMPOSITES AND PROCESSES FOR THE PREPARATION THEREOF

[75] Inventor: Edward G. Howard, Jr., Hockessin, Del.

[73] Assignee: E. I. Du Pont de Nemours and Company, Wilmington, Del.

[21] Appl. No.: 736,539

[22] Filed: Jul. 26, 1991

Related U.S. Application Data

[63] Continuation-in-part of Ser. No. 564,144, Aug. 7, 1990.

[51] Int. Cl.[5] ............................ C08J 5/10; C08K 3/02; C08K 3/34; C08K 11/00; C08L 23/06
[52] U.S. Cl. ................................. 524/789; 524/425
[58] Field of Search ........................... 524/789, 425

[56] References Cited

U.S. PATENT DOCUMENTS

| | | | |
|---|---|---|---|
| 3,944,536 | 3/1976 | Lupton et al. | 260/94.9 R |
| 4,097,447 | 6/1978 | Howard, Jr. | 260/42.14 |
| 4,104,243 | 8/1978 | Howard, Jr. | 260/42.14 |
| 4,126,647 | 11/1978 | Howard, Jr. | 260/878 R |
| 4,151,126 | 4/1979 | Adelman et al. | 252/508 |
| 4,187,210 | 2/1980 | Howard, Jr. | 524/730 |
| 4,234,659 | 11/1980 | Kostandov et al. | 524/789 |
| 4,330,573 | 5/1982 | Kostandov et al. | 427/213 |
| 4,587,163 | 5/1986 | Zachariades | 428/292 |
| 4,655,769 | 4/1987 | Zachariades | 623/1 |

OTHER PUBLICATIONS

Eyrer et al., Kunstoffe German Plastics 77, 617–622 (1987), "Ultrahigh Molecular Weight Polyethylene for Replacement Joints".

*Primary Examiner*—Paul R. Michl
*Assistant Examiner*—U. K. Rajguru

[57] ABSTRACT

A homogeneous composite is provided comprising (a) about 0.5 to 90% by weight of an ultrahigh molecular weight linear polyethylene having a molecular weight of at least about 400,000, a crystalline melting point of greater than 143° C., the reduction of said melting point upon remelting being at least 3° C., and a crystal morphology comprising a bimodal distribution of molecular chain fold spacings reflecting significant populations of both folded and very highly extended molecular chains, and (b) about 0.5 to 90% by weight of at least one filler compound having a neutral-to-acidic surface, said polyethylene being polymerized onto the surface of said filler, and said composite being substantially free of polymer-free filler and of filler-free polymer. Also provided are processes for the preparation of such composites.

10 Claims, No Drawings

HOMOGENEOUS, HIGH MODULUS ULTRAHIGH MOLECULAR WEIGHT POLYETHYLENE COMPOSITES AND PROCESSES FOR THE PREPARATION THEREOF

CROSS-REFERENCE TO RELATED APPLICATION

This application is a continuation-in-part of U.S. patent application Ser. No. 07/564,144 filed Aug. 7, 1990.

BACKGROUND OF THE INVENTION (1) Field of the Invention

This invention relates to filled, physically enhanced composites of ultrahigh molecular weight polyethylene and more particularly to composites having high flex and tensile moduli and processes for the preparation thereof.

(2) Description of the Prior Art

Ultrahigh molecular weight polyethylene (UHMWPE) is known and commercially available. Lupton et al., in U.S. Pat. No. 3,944,536 describe preparation of UHMWPE having unusual toughness and rigidity by inducing crystallization of molten UHMWPE at high temperatures and pressures. The product has a crystalline melting point of 142° to 148° C. and a crystalline form characterized by the absence of chain fold spacings of 50-2000 Angstrom units and the presence of crystal spacings of about 10,000 Angstrom units indicating largely extended, unfolded polymer chains. U.S. Pat. No. 4,587,163 (Zachariades) discloses UHMWPE having isotropic semicrystalline morphology prepared by fusing the original powdered or melt-crystallized stock to a homogeneous melt and cooling under pressure. U.S. Pat. No. 4,655,769 (Zachariades) discloses a "pseudo-gel" of UHMWPE in a solvent, said polyethylene having a crystalline morphology comprising folded chain single crystals and extended chain "shish-kebab" fibrils.

U.S. Pat. Nos. 4,097,447 (Howard), 4,126,647 (Howard), 4,151,126 (Adelman and Howard), 4,187,210 (Howard) and 4,104,243 (Howard) disclose composites of polyolefins, including ultrahigh molecular weight polyethylene, with a variety of finely divided particulate inorganic filler compounds, including alumina, calcium carbonate, kaolinite clay, mica and conductive carbon, and organic filler materials such as polyacrylonitrile, wherein the composites comprise at least about 25% by weight of filler. The aforementioned patents also disclose methods of preparing composites which permit relatively high loadings of filler without sacrifice of essential physical properties In these processes ethylene is polymerized onto the surface of the filler particles such that the resultant composite is substantially free of polymer-free filler and of filler-free polymer. U.S. Pat. Nos. 4,330,573 and 4,234,659 disclose composites wherein a polyolefin having a molecular weight not less than 300,000 is polymerized onto a solid porous inorganic carrier material to provide composites wherein the inorganic carrier content is 50 to 99.5% by weight.

Eyrer et al., Kunstoffe German Plastics 77, 617–622 (1987), in an article entitled "Ultrahigh Molecular Weight Polyethylene for Replacement Joints", point out that the service life of certain joint replacements made of UHMWPE is limited. Analysis of the damage to over 250 explanted hip cups and tibial plateaus revealed a changed property profile which they explained by post-crystallization resulting from oxidative chain decomposition. They suggested optimizing the processing of polyethylene under higher pressure and higher temperature to increase the degree of crystallinity. The Eyrer et al. product displays a creep of above 5% at a compression of 1000 psi (6.9 N/nm$^2$) for 24 hours at 37° C. UHMWPE is a material of choice for use in prosthetic joints, particularly the load bearing hip, because of its high impact strength and inertness to blood. However, creep in the polymer has restricted use of UHMWPE in prosthetic parts.

It is an object of the present invention to provide homogeneous composites of enhanced UHMWPE with various filler materials wherein tensile modulus is significantly increased over conventional composites while essential strength properties and low creep are retained. It is a further object of the present invention to provide composites of UHMWPE that are useful in forming shaped articles including prosthetic articles. A feature of the present invention is a crystal morphology including folded and very highly extended molecular chains. It is an advantage of the present invention to provide relatively low cost composites of UHMWPE with filler materials. A still further object of the present invention is to provide lightly-filled composites of enhanced UHMWPE containing less than 10 weight % filler, said composites having many of the properties of unfilled enhanced UHMWPE. These and other objects, features and advantages of the present invention will become more readily apparent upon having reference to the following description of the invention.

SUMMARY OF THE INVENTION

This invention provides a homogeneous composite comprising (a) about 0.5 to 90% by weight of an ultrahigh molecular weight linear polyethylene having a molecular weight of at least about 400,000, a crystalline melting point of greater than 143° C., the reduction of said melting point upon remelting being at least 3° C., and a crystal morphology comprising a bimodal distribution of molecular chain fold spacings reflecting significant populations of both folded and very highly extended molecular chains, and (b) about 0.5 to 90% by weight of at least one filler compound having a neutral-to acidic surface, said polyethylene being polymerized onto the surface of said filler, and said composite being substantially free of polymer-free filler and of filler-free polymer.

Preferred composites of the invention comprise less than 10% by weight filler or at least 30% by weight filler and have elastic or flexural moduli of about 300 to 1300 kpsi, tensile moduli of about 350 to 1500 kpsi and maximum tensile strength at break of at least 1 kpsi. More preferably tensile modulus is in the range of about 650 to 1500 kpsi, the flexural modulus is about 700 to 1300 kpsi and the reduction of melting point of the constituent polyethylene upon remelting of the composite is at least 6° C.

The composites of the present invention are prepared by a process comprising:

(a) forming an article of a solid, homogeneous particulate composite comprising (i) about 0.5 to 90% by weight of ultrahigh molecular weight polyethylene having a molecular weight of at least about 400,000, and (ii) about 0.5 to 90% by weight of at least one finely-divided filler compound having a neutral-to-acidic surface and having interacted at the surface of said filler a catalytically active amount of transition metal compound, said polyethylene being polymerized onto the surface of said filler, said composite being substantially free of polymer-free filler and of filler-free polymer;

(b) heating said article in an inert atmosphere to a temperature of at least about 180° C. sufficient to melt the UHMWPE and, at this temperature, compressing said article at a pressure of at least 280 MPa for at least 2 minutes;

(c) reducing the temperature to 175° C. or lower while maintaining a pressure of at least 280 MPa, the rate of reduction of temperature being such that temperature gradients in the shaped article are substantially avoided; and, (d) rapidly cooling to a temperature below 100° C. while maintaining a pressure of at least 280 MPa, then reducing the pressure in such a manner that remelting of the polyethylene constituent of the article is avoided.

DETAILED DESCRIPTION OF THE INVENTION

The starting materials for preparing the composites of this invention are homogeneous composites comprising UHMWPE and one or more filler compounds. These starting composites may be prepared by the methods described in the aforementioned U.S. Pat. Nos. 4,097,447 (Howard), 4,126,647 (Howard), 4,151,126 (Adelman and Howard), 4,187,210 (Howard) and 4,104,243 (Howard), all of which are hereby incorporated by reference herein in their entirety and hereinafter referred to as "the aforementioned patents". In the processes of these patents, the polyethylene is polymerized directly onto finely divided filler particles. A particularly useful method of preparing suitable finely divided filler is described in U.S. Pat. No. 4,104,243.

Preferably, in the starting composite of step (a) of the present process, the polyethylene constituent has a molecular weight of at least about 1,000,000, the finely divided filler compound has a weight-average equivalent spherical particle diameter of 0.1 to less than 50 microns and the transition metal compound interacted at the filler surface provides 0.000001-1.7 mg-atom of transition metal per gram of filler, and said starting composite is a free-flowing powder having particle sizes in the range of 0.1 micron to 5 mm, and having a 10-second micronization homogeneity of at least 50% and a micronization homogeneity index of at least 20. Preferably the transition metal is selected from the group consisting of titanium, zirconium and chromium.

Preferably in step (b), the composite is heated to about 200° to 230° C. before pressure is applied. On applying pressure, the temperature may rise several degrees, insuring that the constituent polymer remains molten. Pressure can be applied at any temperature during the heating cycle provided said temperature exceeds about 200° C. The composite may be preheated outside the pressure equipment and transferred hot to said pressure equipment provided the preheating and transferring is carried out in an inert atmosphere. Step (b) heating may be carried out for at least 0.5 hour before pressure is applied.

In step (c) the polymer must be cooled slowly at the high pressure until the constituent polyethylene is fully crystallized. Note that the pressure in steps (b)-(d) may be at least 300 MPa. At a pressure of 300 MPa the crystallization temperature of UHMWPE is in the range of about 200° to 210° C.

Suitable equipment for carrying out the invention process includes, for example, compression molding apparatus capable of developing the temperatures and pressures required, and pressure vessels wherein pressure is applied through the agency of a pressure transfer fluid. If the latter is employed great care must be exercised to enclose the composite in a material that is inert to the composite and to the transfer fluid under processing conditions and that retains its full integrity under said processing conditions. Contact with the pressure transfer fluid under process conditions can have a deleterious effect on the composite.

By "fluid" in the process of the invention is meant a liquid, vapor or gas that is substantially inert to the encasing material and to the materials of construction of the pressure vessel under processing conditions. Non-limiting examples of suitable pressure transfer fluids include water, mono- and dihydric alcohols, hydrocarbons, nitrogen, argon, helium and carbon dioxide. Water, nitrogen and argon are preferred, water being most preferred.

Materials suitable for encasing the composites for use in contact with pressure transfer fluids include aluminum, stainless steel and iron sheeting. When the pressure transfer fluid is a liquid, such as water or alcohols, suitable encasing materials can also include ultrahigh molecular weight polyethylene, polypropylene and fluoropolymer films of at least 1 mm thickness, said polymers being sufficiently high melting and viscous to retain integrity under processing conditions.

Filler compounds useful in preparing the starting composites for conversion to the enhanced composites of this invention include inorganic fillers described in the aforementioned patents (U.S. Pat. No. 4,187,210, column 8, lines 49 to column 9, line 48; U.S. Pat. No. 4,097,447, column 3, lines 32–48; U.S. Pat. No. 4,151,126, column 4, line 54 to column 5, line 43). Organic fillers such as polymers may also be used as described for polyacrylonitrile in aforesaid patent '647, providing ethylene can be polymerized onto the surfaces of said fillers. Suitable fillers will normally having the characteristics described in U.S. Pat. No. 4,187,210 at column 10, line 31 to column 14, line 49. Polymers other than UHMWPE may also be included in the composites along with inorganic filler compounds as additives for tailoring required properties. Preparation of starting composites is described in U.S. Pat. No. 4,187,210 at column 14, line 50 to column 17, line 60.

Preferred inorganic filler compounds for use in this invention include alumina hydrates, silicas, water-insoluble silicates, calcium carbonate, basic aluminum sodium carbonates, hydroxyapatite and calcium phosphates. Hydroxyapatite and calcium hydrogen phosphate ($CaHPO_4$) are most preferred filler compounds. A neutral-to-acidic filler surface is necessary to permit adequate catalyst reception and subsequent polymerization of ethylene thereon. Filler compounds having surfaces that are relatively basic, i.e., not neutral-to acidic, require coating with an acidic material, preferably an acidic oxide such as phosphoric acid, silica, alumina or acid phosphate to provide an appropriately neutral-to-acidic surface.

Two or more starting composites having different properties may be blended together as described in U.S. Pat. No. 4,187,210 at column 18, lines 34–50, to provide a new composite having properties intermediate to those of the constituent composites. Numerous additive can also be blended with the UHMWPE/filler composites as described in U.S. Pat. No. 4,187,210 at column 18, line 51 to column 19, line 20, for purposes of stabilization against UV radiation, oxidation, biodegradation and the like.

Methods of shaping (forming) starting composites are described in the aforementioned patents, for example U.S. Pat. No. 4,187,210 at column 19, line 21 to column 21, line 5. The starting composite is normally shaped by molding prior to, or during, enhancement according to the present invention, but the enhanced composites may be ground and reformed, e.g., by powder compression techniques, provided the constituent polymer is not remelted during such processing.

The enhancement of UHMWPE constituent concerns the conversion under heat and pressure of the UHMWPE constituent of the starting composite to a preferred morphology having a bimodal distribution of molecular chain fold spacings and characterized by a DSC melting temperature greater than 143° C., the reduction in said melting temperature upon remelting being at least about 3° C. An enhanced composite is a homogeneous, filled composite of the present invention wherein the polyethylene constituent has been converted to said preferred morphology.

The composites of this invention have flexural and tensile moduli that are substantially higher than those of the conventional starting composites. The examples provide enhanced composites having flexural moduli up to 332% higher and tensile moduli up to 213% higher than the corresponding starting composites. These unusually high moduli are combined with very acceptable levels of elongation and impact resistance. The enhanced composites are excellent in uses currently served by ultrahigh molecular weight polyethylene, such as prosthetic articles and orthopedic joint and bone replacement parts. In biomedical applications such as bone replacement, suitable mineral filler compounds include hydroxy apatite, a calcium phosphate, and phosphated calcium carbonate, compounds which are fully compatible with natural bone. As already indicated, mixtures of filler materials may be employed. Inclusion of other inorganic materials such as clay, silica or calcium sulfate in composites useful for biomedical applications can be beneficial.

Other uses for which the enhanced composites are suitable include load bearing applications and metal replacement in shaped articles such as molded objects, films, cylindrical bars, sheeting and panels wherein the lighter weight and electrical insulation properties combined with high strength and rigidity of the present composites offer marked advantages. The enhanced composites of the invention can be formed into shaped articles by techniques described in the aforementioned patents.

EXAMPLES

In the following examples of specific embodiments of the invention all parts and percentages are by weight unless otherwise specified. Unless otherwise noted, triisobutylaluminum is added as a 0.95 M solution in n-heptane. Polymer inherent viscosity and the filler content of the composites were determined as described in U.S. Pat. No. 4,187,210. In the examples physical properties are determined by the following ASTM test designations.

| Property | Test Specifications |
| --- | --- |
| Tensile Strength, max. (T) | ASTM D638-71A |
| Tensile Modulus, initial | ASTM D638-71A |

| Property | Test Specifications |
| --- | --- |
| Flexural Modulus | ASTM D790-71 |
| Elongation at Break | ASTM D638-71A |
| Izod Impact Strength | ASTM D256-72A |

In the tensile, elongation and modulus tests, test bars of Type I, Type V and Type 1708 of ASTM test method 638-72 were used and bars were prepared without lubricating fluid according to ASTM test method 638-44T. The polyethylene components of the composites which are preferred for use in the present invention are of ultrahigh molecular weight having molecular weights in excess of about 400,000, preferably at least about 1,000,000, more preferably at least about 4,000,000 as defined by a melt index (ASTM D1238) of essentially zero and a reduced specific viscosity (RSV) greater than 8, preferably 25–30. The relationships of RSV to intrinsic viscosity and to molecular weight are those of R. Chaing as presented by P. S. Francis et al., J. Polymer Science, 31, 453 (1958). Such polymers have very high inherent viscosities and are sufficiently viscous in the molten state that the composites of the invention do not flow under processing conditions.

Thermal transitions such as melting point were measured with a Du Pont Model 9900 Differential Scanning Calorimeter (DSC) in accordance with B. Wunderlich, "Thermal Analysis", published by Rensselaer Polytechnic Institute (1981). Evidence for a bimodal distribution of molecular chain fold spacings was obtained from DSC thermal transition data (see Examples 4 and 7).

EXAMPLE 1

A. Preparation of Starting Composite

The filler used in this example was aluminum oxide trihydrate $Al_2O.3H_2O$ (Mineral Products Co., Grade No. 431). The alumina was dried at 160° C. under nitrogen for about 48 h. 0.5 gal of deoxygenated cyclohexane was filtered under nitrogen purge through Woelm acid grade alumina into an enclosed blender cup. 22.6 mmoles of triisobutyl aluminum solution (1.6 M in heptane) and 9.86 ml of tetraneophylzirconium solution (0.1 M in toluene) were placed in the blender cup and allowed to stand under nitrogen for 3 h. 1600 g of the dried alumina was then added under nitrogen and the suspension was loaded into a stirred, nitrogen-purged autoclave containing 2.5 gal of dry, deoxygenated hexane. With a stirring rate maintained at 500 rpm, the autoclave was heated to 60° C. Ethylene was introduced and polymerized under 1.3 MPa ethylene pressure for 20 min. 600 g of ethylene was absorbed and 2025 g of powdered composite was produced, 1874 g of which passed through a 16-mesh screen.

The product was found by ash analysis to contain 74.5% $Al_2O_3.3H_2O$. Test bars were compression molded at 160° C. and 21 MPa for determination of physical properties.

B. Enhancement of Polyethylene Constituent 14 g of the powdered composite prepared in Part A was placed in a tightly fitting mold and heated to 185° C. and then subjected to 310 MPa pressure. The sample was allowed to cool slowly to 175° C. and then rapidly while full pressure was maintained. Pressure was released when the sample had cooled to ambient temperature. The resultant 2-inch square plaques were cut to TYPE 1708 bars for tensile testing. Three tests were averaged in each case.

| Melting Endotherm (DSC): | | |
|---|---|---|
| First heating: | | 148.1° C. |
| Second heating: | | 137.8° C. |
| Tensile Properties | Product | Starting Comp. |
| Tensile Strength-yield, psi | 1804 | 1836 |
| Tensile Strength-max, psi | 2176 | 1982 |
| Tensile Strength-break, psi | 2176 | 1973 |
| Modulus, kpsi | 926 | 849 |
| Elongation-yield, % | 11.4 | 0.6 |
| Elongation-break, % | 66.4 | 171 |
| Izod Impact, ft-lb/in of notch | | 6.3 |

EXAMPLE 2

A. Preparation of Starting Composite

Camel-White calcium carbonate was coated with an acidic coating of aluminum oxide as follows: The $CaCO_3$ (250 lbs) was suspended in 80 gallons of water and strongly stirred while a solution of 5.3 kg of $AlCL_3.6H_2O$ in 9 gallons of water was added. The solids were collected by centrifugation, washed with water to remove chloride ions, suspended in water to give a 40–50% solids slurry. The slurry was then spray dried. A portion was further dried at 180° C. under nitrogen for about 12 h.

3.5 gal of deoxygenated cyclohexane was passed under nitrogen purge through Woelm acid grate alumina into a blending tank. 40 mmoles of triisobutyl aluminum solution (1.6 M in heptane) and 20 ml of tetraneophylzirconium solution (0.1 M in toluene) were placed in the tank and allowed to stand under nitrogen for 15 min. 1400 g of the dried $CaCO_3$ was then added under nitrogen into the stirred, nitrogen-purged tank. The suspension was stirred for at least 15 min then pushed into an autoclave by means of nitrogen pressure. The stirred autoclave was heated to 50° C., then ethylene was introduced and polymerized under 1 MPa ethylene pressure for 98 min. 760 g of ethylene was absorbed and 1760 g of powder was obtained.

The product was found by ash analysis to contain 61.62% $CaCO_3$. Test bars were compression molded at 160° C. and 3000 psi for determination of physical properties.

B. Enhancement of Polyethylene Constituent 16 g of the powdered composite prepared in Part A was placed in a tightly fitting mold and heated to 185° C. and then subjected to 310 MPa pressure. The sample was allowed to cool slowly to 175° C. and then cooled rapidly while full pressure was maintained. Pressure was released when the sample had cooled to ambient temperature. The resultant 2-inch square plaques were cut to TYPE 1708 bars for tensile testing; three tests were averaged in each case.

| Melting Endotherm (DSC): | | |
|---|---|---|
| First heating: | | 145.6° C. |
| Second heating: | | 138.9° C. |
| Tensile Properties | Product | Starting Comp. |
| Tensile Strength-yield, psi | 2230 | 2160 |
| Tensile Strength-max, psi | 2527 | 2939 |
| Tensile Strength-break, psi | 2527 | 2937 |
| Modulus, kpsi | 697.5 | 511 |
| Elongation-yield, % | 4.8 | 1.8 |
| Elongation-break, % | 140.5 | 248 |
| Izod Impact, ft-lb/in of notch | | 10.2 |

EXAMPLE 3

A starting composite containing 65% of $CaCO_3$, prepared as described in Example 2, was hot pressed at 160° C., cooled to room temperature and cut into two pieces. One piece was subjected to physical testing without further processing (starting composite). The second piece was further processed to enhance the UHMWPE constituent as follows: The piece was enclosed in Teflon® (trademark of E.I. du Pont de Nemours and Company) film, sealed in a Teflon® FEP bag and placed in a large pressure vessel. The vessel was sealed and heated to 220° C. Water was then pumped into the vessel until the pressure reached 300 MPa. Temperature (217° to 220° C.) and pressure were maintained for 5 hours. The sample was then cooled over a 6-hour period to 181° C., then to 83° C. in a further 2 hours 20 min. The resulting plaque was machined into test bars for determination of physical properties. Two tests were averaged in each case.

| Melting Endotherm (DSC): | | |
|---|---|---|
| First heating: | | 147.8° C. |
| Second heating: | | 136.4° C. |
| Tensile Properties | Product | Starting Comp. |
| Tensile Strength-yield, psi | 2242.5 | 2087.5 |
| Tensile Strength-max, psi | 2263.5 | |
| Tensile Strength-break, psi | 1499 | 3213 |
| Modulus, kpsi | 1340.5 | 628.5 |
| Elongation-yield, % | 1.0 | 4.4 |
| Elongation-break, % | 46 | 287 |
| Flexural Modulus, kpsi | 1127 | 394.8 |
| Izod Impact, ft-lb/in of notch | 3.45 | 11.2 |

EXAMPLE 4

A starting composite containing 58% of calcined clay (Al-Sil-Ate W), prepared as described in Example 2, was hot pressed at 160° C. and divided into two pieces. One piece was tested directly (starting composite); the other piece was subjected to enhancing procedure as described in Example 3. Test bars were prepared and tested, two tests being averaged in each case.

| Melting Endotherms (DSC); two endotherms were obtained: | | |
|---|---|---|
| First endotherm: | | |
| First heating: | | 144.8° C. |
| Second heating: | | 134.5° C. |
| Second endotherm: | | |
| First heating: | | 136.5° C. |
| Second heating: | | 134.5° C. |
| Tensile Properties | Product | Starting Comp. |
| Tensile Strength-yield, psi | 3207.5 | 2734.5 |
| Tensile Strength-max, psi | 3207.5 | 2735.5 |
| Tensile Strength-break, psi | 2828 | 2212 |
| Modulus, kpsi | 1225.5 | 869 |
| Elongation-yield, % | 0.7 | 0.8 |
| Elongation-break, % | 1.8 | 58.5 |
| Flexural Modulus, kpsi | 763 | 229.8 |
| Izod Impact, | 0.93 | 4.25 |

EXAMPLE 5

Enhanced Calcium Hydrogen Phosphate/UHMWPE Composite

A. Coating of Calcium Hydrogen Phosphate with Titanium Oxide

Into a 3 l glass resin kettle was placed a glass tube extending to the bottom and then a layer of glass wool which was covered with 1 kg of calcium hydrogen phosphate. The surface was covered with more glass wool. Nitrogen was purged through the glass tube while heating the flask contents to 260° C. When the mineral was completely heated to 260° C., $TiCl_4$ liquid was injected with a syringe and needle to the bottom glass wool layer. At 30 min intervals, a total of five 10 mL additions of $TiCl_4$ were made.

The $TiCl_4$ distilled through the calcium hydrogen phosphate and coated it with a coating of what is believed to be titanium oxychloride. Thirty minutes after the last addition, the system was purged to remove unreacted $TiCl_4$. The cold product was stored in air-permeable polyethylene bags. Ti-Cl bonds in the coating were hydrolyzed by moist air entering the bags. Subsequent heating at 325° C. in Step 2 yielded a titanium oxide coating.

B. Preparation of UHMWPE/Mineral Composite

A reaction mixture was prepared by adding to a dry, oxygen-free 5 l flask having a food blender blade in the flask bottom, 3 l of dry, oxygen-free cyclohexane, 200 g of $TiO_2$-coated calcium hydrogen phosphate from Step 1 which had been dried at 325° C. under nitrogen purge, and 16 mmoles of triisobutyl aluminum, followed by vigorous stirring while maintaining the nitrogen atmosphere. The resultant dispersion of calcium hydrogen phosphate was transferred by pressure to a 1 gallon, dry, oxygen-free autoclave. Ethylene was polymerized at 0.5–1 MPa ethylene pressure with stirring for 3.5 h at 50°–70° C. The polymerization absorbed 135 g of ethylene during a 107 minute period to give 325 g of powdery, free-flowing product (ash 55.6%). A film of this product hot pressed at 160° C. was very strong and tough.

C. Enhancement of the UHMWPE Component

A 3 in.×5 in.×⅛ in. plaque of the composite prepared in Part B, formed at 160° C. under 27.6 MPa, was covered with a sheet of Teflon ® TFE fluorocarbon film and supported on a steel backing plate to retain flatness, the whole being encapsulated in a ⅛ in. thick envelope of UHMWPE. The enclosed sample was placed in a pressure vessel having a 4 in. bore. The vessel was sealed, pressured with water and heated to 220° C. at a pressure of about 10 MPa. After 2 h, pressure was increased to 300 MPa. The vessel was allowed to cool over 3 h to 185° C. After 2 h at 185° C. the vessel was allowed to cool slowly to 175° C., held at this temperature for 2 h, slowly cooled to 150° C., then rapidly cooled to 80° C. Pressure was maintained at 300 MPa throughout the cooling. The plaque was then recovered and cut into test samples. Test results comparing the starting and enhanced composites are in Table 2.

Use of Teflon ® film is not essential but if not used, it is necessary to mill away carefully any adhering polyethylene cover.

| DSC: | | |
| --- | --- | --- |
| First heating: | 147.3° C. | |
| Second heating: | 135.2° C. | |
| Tensile Properties | Product | Starting Comp. |
| Tensile Strength, psi | | |
| yield | 2371 | 3247 |
| max | 2901 | 3873 |
| break | 2905 | 3871 |
| Modulus, kpsi | 673.0 | 425.3 |
| Elongation %, break | 128 | 167 |
| Izod Impact, ft-lb/in of notch | 8.9 | 15.0 |

EXAMPLE 6

Enhanced UHMWPE/Acid Phosphate-Coated $CaCO_3$ Composite

A. Composite Preparation

A solution of 45 g of 85% phosphoric acid in 200 ml of water was added dropwise with stirring to a suspension of 600 g of "Gamma Sperse" 80 calcium carbonate prepared as in Example 27 of the aforementioned U.S. Pat. No. 4,187,210. The suspension was filtered, and the solid on the filter was washed with water and dried. The solid was further dried at 250° C. for 18 h in a 30 l/h stream of nitrogen. The reaction mixture was prepared by adding 70 g of $H_3PO_4$-coated $CaCO_3$ to 600 ml of dry and oxygen-free cyclohexane containing 4 mmol (0.8 g) of triisobutylaluminum and 0.2 mmol of tetrabenzylzirconium in 2 ml of toluene in an enclosed blender cup under nitrogen purge. After stirring, the mixture was transferred to a dry and oxygen-free autoclave. The polymerization was carried out at 50° C. under 100 psi of ethylene in 9 min. The resulting composite powder contained, by ash analysis, 61.6% $CaCO_3$.

B. Enhancement of the UHMWPE Constituent

The composite from Part A (25 g) was placed in a tight-fitting mold which was heated to 180° C. and then subjected to 310 MPa pressure for 2 min followed by slow cooling (about 15 min) to 160° C. while maintaining the pressure. The composite was then cooled rapidly to room temperature and the pressure released.

DSC melting endotherms at 146.2° C. and 138.8° C. were observed during a first heating.

EXAMPLE 7

Twenty-five g of a mineral/UHMWPE composite containing 70% $Al_2O_3.3H_2O$, prepared as described in Example 1, were placed in a mold as in Example 7, heated to 195° C. and pressured to 310 MPa for 2 min, followed by cooling over 25 min to 160° C. while maintaining pressure. The composite was then cooled rapidly to room temperature and the pressure released. The melting point of the UHMWPE constituent was determined by DSC.

| Melting Endotherm (DSC): | |
| --- | --- |
| Fist heating: | 147.0° C. |
| Second heating: | 139.0° C. |

EXAMPLE 8

Four g of a mineral/UHMWPE composite containing 65.9% of a mixture of 95% CaCO$_3$ and 5% TiO$_2$, prepared essentially as described in Example 45 of U.S. Pat. No. 4,187,210, was heated in a mold to 200° C. under 310 MPa for 2 min, followed by a cooling/pressure schedule as in Example 7.

| Melting Endotherm (DSC): | |
|---|---|
| First heating: | 150.3° C. |
| Second heating: | 136.5° C. |

EXAMPLE 9

A. Preparation of Starting Composite

A mixture of 20 g of Englehard Satintone™-1 calcined clay (previously dried for 17 h at 150° C. under nitrogen purge), 500 ml of dry, oxygen-free cyclohexane, 5 mmoles of triisobutyl aluminum, and 0.2 mmole of tetraneophylzirconium was stirred under 1.38 MPa ethylene pressure for 3 h 7 min, during which time 80 g of ethylene was consumed. The UHMWPE polyethylene/clay composite product contained 20 wt % clay and was isolated as soft, powdery spheres.

B. Enhancement of Polyethylene Constituent

The powdery product prepared in Part A was compression molded for 5 min at 28 MPa pressure and 170° C. Plaques (3 in × 3 in × ⅛ in) were individually sealed in aluminum foil-coated polyethylene bags; the assemblies were sealed in another aluminum foil-coated polyethylene bag with a stainless steel plate to prevent the plaques from buckling.

The samples were placed in a pressure vessel and heated to 225° C. The vessel was then pressured to 300 MPa with water, and, while maintaining pressure, cooled to 178° C. in 2 h, then to 98° C. in 6.5 h. Some water seeped into the bags during this procedure but without apparent effect on the enhanced product. After cooling to room temperature and pressure release, the samples were soaked in concentrated hydrochloric acid to dissolve the aluminum; residual polyethylene from the bags was easily removed from the enhanced UHMWPE composite samples. The plaques were cut to TYPE 1708 bars for tensile testing.

| Melting Endotherm (DSC): | |
|---|---|
| First heating: | 143.8° C. |
| Second heating: | 136.4° C. |
| Tensile Properties | Product |
| Tensile Strength-yield, psi | 3056 |
| Tensile Strength-max, psi | 5384 |
| Tensile Strength-break, psi | 5384 |
| Elongation-yield, % | 7.0 |
| Elongation-Break, % | 194 |
| Izod Impact, ft-lb/in of notch | 16.3 nb | nb = non-break

EXAMPLE 10

A. Preparation of Starting Composite

A mixture of 20 g of Englehard AS™ 400 clay (previously dried for 17 h at 150° C. under nitrogen purge), 500 ml of dry, oxygen-free cyclohexane, 5 mmoles of triisobutyl aluminum, and 0.2 mmole of tetraneophylzirconium was stirred under 1.38 MPa ethylene pressure at 60° C. for 12.5 h. One hundred and twenty five g of UHMWPE polyethylene/clay composite product containing 16 wt % clay was isolated as a white powder.

B. Enhancement of Polyethylene Constituent

The powdered product prepared in Part A was compression molded into plaques and recrystallized under heat and pressure as described in Example 9, Part B.

| Melting Endotherm (DSC): | |
|---|---|
| First heating: | 145.8° C. |
| Second heating: | 137.6° C. |
| Tensile Properties | Product |
| Tensile Strength-yield, psi | 3369 |
| Tensile Strength-max, psi | 3749 |
| Tensile Strength-break, psi | 3748 |
| Elongation-yield, % | 2.5 |
| Elongation-Break, % | 153 |
| Izod Impact, ft-lb/in of notch | 17.7 nb | nb = non-break

EXAMPLE 11

A composite of UHMWPE and clay prepared as in Part A of Example 9 using 8 g of calcined clay and an ethylene consumption of 92 g is obtained as a white powder containing 8 wt % clay. Recrystallization of the polyethylene constituent of this composite according to the procedure of Example 9, Part B, results in a shaped composite having a maximum tensile strength of at least 3000 psi, an elongation at break of at least 150%, a tensile modulus of at least 250 kpsi, an Izod impact strength of at least 12 ft-lb per in of notch, and wherein said polyethylene constituent has a crystalline melting point of greater than 143° C., the reduction in said melting point upon remelting being greater than 3° C.

It can be appreciated that the above described examples are intended to be illustrative of, and not limiting, the invention described herein. Further, and as is readily understood by those skilled in the art, there can be a variety of modifications to the invention as described and claimed herein without departing from the spirit and the scope thereof.

I claim:

1. A process for preparing a homogeneous composite comprising (a) about 0.5 to 90% by weight of an ultra-high molecular weight linear polyethylene having a molecular weight of at least about 400,000, a crystalline melting point of greater than 143° C., the reduction of said melting point upon remelting being at least 3° C. and a crystal morphology comprising a bimodal distribution of molecular chain fold spacings reflecting significant populations of both folder and very highly extended molecular chains, and (b) about 0.5 to 90% by weight of at least one filler compound having a neutral-to-acidic surface, said polyethylene being polymerized onto the surface of said filler, and said composite being substantially free of polymer-free filler and of filler-free polymer, comprising:

(a) forming an article of a solid homogeneous particulate composite comprising (i) about 0.5 to 90% by weight of ultrahigh molecular weight polyethylene having a molecular weight of at least about 400,000, and (ii) about 0.5 to 90% by weight of at least one finely-divided filler compound having a neutral-to-acidic surface and having interacted at the surface of said filler a catalytically active amount of transition metal compound, said polyethylene being polymerized onto the surface of said filler, said composite being substantially free of polymer-free filler and of filler-free polymer;

(b) heating said article in an inert atmosphere to a temperature of at least 180° C. sufficient to melt said polyethylene and, at this temperature, compressing said article at a pressure of at least 280 MPa for at least 2 minutes;

(c) reducing the temperature to 175° C. or lower while maintaining a pressure of at least 280 MPa, the rate of reduction of temperature being such that temperature gradients in the shaped article are substantially avoided; and, (d) rapidly cooling to a temperature below 100° C. while maintaining a pressure of at least 280 MPa, then reducing the pressure in such a manner that remelting of the polyethylene constituent of the article is avoided.

2. The process of claim 1 wherein the polyethylene constituent of the composite in step (a) has a molecular weight of at least about 1,000,000.

3. The process of claim 1 wherein the finely divided filler compound in the step (a) composite has a weight-average equivalent spherical particle diameter of 0.1 to less than 50 microns.

4. The process of claim 3 wherein the transition metal compound interacted at the filler surface provides 0.000001–1.7 mg-atom of transition metal per gram of filler.

5. The process of claim 4 wherein the transition metal is selected from the group consisting of titanium, zirconium and chromium.

6. The process of claim 1 wherein the particulate composite of step (a) is a free-flowing powder having particle sizes in the range of 0.1 micron to 5 mm, and having a 10-second micronization homogeneity of at least 50% and a micronization homogeneity index of at least 20.

7. The process of claim 1 wherein the pressure in steps (b)–(d) is at least 300 MPa.

8. The process of claim 1 wherein the heating in step (b) is continued for at least 0.5 hour before pressure is applied.

9. The process of claim 1 wherein pressure is applied in steps (b)–(d) by means of a fluid.

10. The process of claim 9 wherein the fluid is water.

* * * * *